United States Patent
Guidicelli

[15] 3,701,934
[45] Oct. 31, 1972

[54] CONTROL SYSTEM FOR A WINDSHIELD WIPER AND CLEANER UNIT

[72] Inventor: Charles Guidicelli, Bagnolet, France

[73] Assignee: Societe Anonyme STOP, St. Oven, France

[22] Filed: May 4, 1971

[21] Appl. No.: 140,039

[30] Foreign Application Priority Data

May 15, 1970 France...................7017815

[52] U.S. Cl..........................318/102, 318/DIG. 2
[51] Int. Cl..................................B60s 1/02
[58] Field of Search............307/10, 141, 141.4, 155; 317/141 R, 155, 155.5; 318/50, 62, 101–105, 112, 443, 445, 446, 484–487

[56] References Cited

UNITED STATES PATENTS 3,582,732  6/1971  Kovalsky...................318/102
3,049,649  8/1962  Burke et al.............317/141 R Primary Examiner—Bernard A. Gilheany
Assistant Examiner—W. E. Duncanson, Jr.
Attorney—Scrivener, Parker, Scrivener & Clarke

[57] ABSTRACT

The invention relates to a control system for a vehicle windshield-wiper and cleaner allowing the windshield-wiper and the windshield-cleaner to be energized simultaneously and to be de-energized one after the other. In this system, the operation of the windshield-wiper is controlled through the contact of an electromagnetic relay having a first coil connected across the motor actuating the pump of the windshield-cleaner, and a second coil connected in series with a capacitor across the control switch of the pump. When the control switch is closed, the relay is energized and the capacitor is short-circuited. When the control switch is opened, the current charging the capacitor flows through the second coil of the relay and causes a delay to the release of this relay, hence a delay to the deenergization of the windshield-wiper. With this arrangement, a delay of substantial and constant duration can be obtained with a capacitor of relatively small size.

1 Claim, 1 Drawing Figure

PATENTED OCT 31 1972 3,701,934
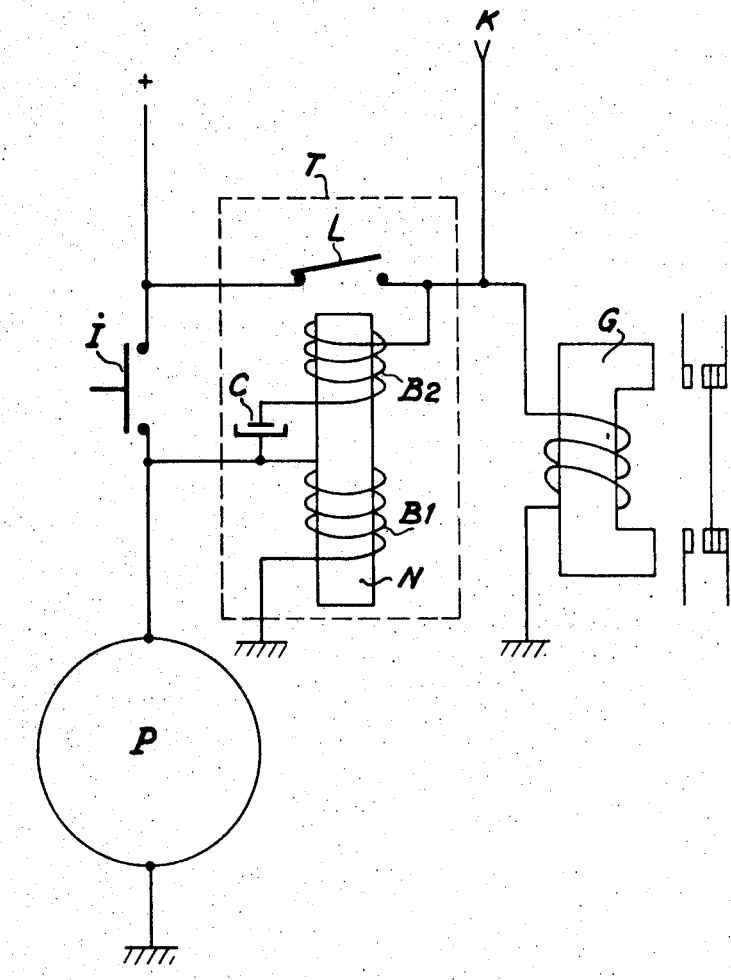

CONTROL SYSTEM FOR A WINDSHIELD WIPER AND CLEANER UNIT

The invention relates to a control system for a vehicle windshield-wiper and cleaner allowing the windshield-wiper and the windshield-cleaner to be energized simultaneously and to be de-energized one after the other. In this system, the operation of the windshield-wiper is controlled through the contact of an electromagnetic relay having a first coil connected across the motor actuating the pump of the windshield-cleaner, and a second coil connected in series with a capacitor across the control switch of the pump. When the control switch is closed, the relay is energized and the capacitor is short-circuited. When the control switch is opened, the current charging the capacitor flows through the second coil of the relay and causes a delay to the release of this relay, hence a delay to the de-energization of the windshield-wiper. With this arrangement, a delay of substantial and constant duration can be obtained with a capacitor of relatively small size.

This invention relates to a control system for windshield wiper and cleaner units such as those used on motor vehicles.

On most vehicles, a windshield cleaner allows jets of liquid to be directed on the windshield with a view to cleaning the latter. The windshield wiper on the vehicle must be operated simultaneously with the cleaner, and then give some more strokes after the cleaner is shut off so as to clear the remaining traces of liquid.

Although the windshield cleaner and the windshield wiper might easily be separately controlled, some vehicle provides, as a facility to the operator, a windshield cleaner comprising an electrically operated pump which, when started, brings about the operations of the windshield wiper if the latter is not already in use.

In known control systems allowing the windshield wiper and the windshield cleaner to be started simultaneously and to be stopped one after the other, the end of the windshield wiper operation is delayed by means of a timing device such as a delayed electromagnetic relay or a thermal relay. However, electromagnetic relays would be bulky and uneconomical if delays of sufficient duration should be obtained by conventional methods such as the discharge of a condenser. On the other hand, the delay of thermal relays lacks precision, since the operating cycle of the bimetallic elements used in those relays has a duration depending on the ambient temperature which can vary from that encountered near a hot engine, to that encountered outdoors by cold weather.

The object of the invention is to provide a control system of relatively small size, allowing the windshield wiper to come to a stop with a substantially stable delay.

In the control system of the invention, a control switch is inserted in a line supplying a voltage to a circuit comprising an electrical motor operating a pump for a windshield cleaner, and an electromagnetic timing device having an output contact connected to a windshield wiper. According to the invention, the timing device comprises a relay having a magnetic core on which are mounted a first coil connected across the pump motor, and a second coil connected in series with a capacitor to form an assembly having one end connected to the common point of the control switch and the pump motor, and the other end connected to the supply voltage either directly or through the output contact of the timing device.

The delayed action of this control system is not derived from the discharging time of the capacitor as was the case in the past, but from the charging time of this capacitor, thus allowing the use of a capacitor having a smaller size.

The invention will now be described by way of example with reference to the accompanying drawing, in which the single FIGURE shows the diagram of a control system according to the invention.

In the diagram, a push-button switch I is inserted in a line connecting the positive terminal + of a vehicle battery (not shown) to one of the terminals of an electrical motor P operating a pump for a windshield cleaner. The other terminal of the pump P is connected to ground. The diagram further comprises a two-way relay G for a windshield wiper. The coil of relay G may either be energized by a control signal K which serves to control the normal separate operation of the windshield wiper, or through a contact L in a timing device T.

The timing device T comprises a capacitor C and a relay with a core N on which two coils B1, B2 are mounted. The contact L belongs to the relay and is normally open. When energized alone, the coil B1 develops a number of ampere-turns sufficient for activating the relay. The coil B1 is connected in parallel across the pump P and has preferably a low resistance. The other coil B2 may develop a lesser number of ampere-turns and has preferably a high resistance. It is connected in series with the capacitor C, one end of this assembly being connected down stream of contact L, and the other end to the non-grounded end of the coil B1. In other words, in the closed position of contact L, the series arrangement of coil B2 and capacitor C is connected in parallel across switch I. Preferably, capacitor C is a large capacity electrolytic condenser.

In operation, when the switch I is depressed, the pump P and the coil B1 are simultaneously energized. Then, the pump starts operating and the contact L is switched to the closed position, thus causing the energization the relay G to simultaneously actuate the windshield wiper. When the switch I is released, the voltage across the pump P and the coil B1 is eliminated and the pump is stopped practically at once, but the opening of the contact L, hence the moment when the windshield wiper stops is delayed. This is due to the fact that the contact L remains closed when the switch I is opening, since the current from terminal + of the battery flows through the contact L, the coil B2 and the capacitor C, to be transmitted to ground through the pump P and through the coil B1. Seeing that the pump P and the coil B1 have a low resistance, and that the capacitor C has a low impedance when it begins charging, the current flowing through the coil B2 is sufficiently strong for keeping the contact L in the closed position. The opening of the contact L only occurs when the current through the coil B2 drops to a value below the holding current as the impedance of the capacitor C increases simultaneously with the increasing charge level of this capacitor.

The windshield wiper can also be started by the actuation of its normal control means to produce the signal K energizing the relay G. This mode of operation of the windshield wiper will not impede the operation of the pump P.

In the diagram, it has been assumed that the actuation of the windshield wiper is controlled by a two-way relay. This arrangement supposes that the motor of the windshield wiper comprises a field magnet. It will be understood that the diagram would be practically unchanged if a conventional relay should be used in conjunction with a motor comprising a two-way field winding. Other modifications can be made to the windshield wiper circuit, particularly with respect to the point to which the signal K is connected, without causing any operational or structural change in the control system of the invention. It will also be noted that practically no change in the operation of the system would be observed if the assembly comprising the coil B2 and the capacity C had one end connected to the positive terminal +, instead of being connected downstream of the timing device T.

In an exemplary embodiment conceived for operation on a 12 volt battery, the timing device T comprised an electrolytic condenser having a capacity of 500 microfarads and a service voltage of 16 volts, and a relay having a core about 40 mm in length and 8 mm in diameter, with a coil B1 of about a 40 ohm resistance and a coil B2 of about a 1500 ohm resistance. The delay which the system caused in stopping the windshieldwiper was about 3 seconds, which is acceptable for ensuring that every undesirable trace of the liquid projected by the windshield cleaner is wiped out.

I claim:

1. A control system for a windshield wiper and cleaner unit having a direct current line for supplying a voltage to an electrical motor operating a pump for a windshield cleaner, a control switch in said line and a timing device having a normally open output contact in series between said line and a windshield wiper, characterized in that the timing device is provided with an electromagnetic relay for closing said output contact and includes a first coil connected across the electrical motor and a second coil connected in series with a capacitor to form a series circuit having one end connected with said direct current line through said contact and having its other end connected to the common point of the control switch and said electrical motor so that upon closing of said control switch the electrical motor and said first coil are simultaneously energized to operate said pump, energize said relay to close the output contact and short circuit said series circuit, opening of said control switch de-energizing said electrical motor and delaying the opening of said output contact due to the charging current of the condenser flowing through said second coil.

* * * * *